Sept. 11, 1956     H. M. WALKER     2,762,760
EXTRACTIVE DISTILLATION OF PHENOL-CONTAINING MIXTURES
Filed July 23, 1952
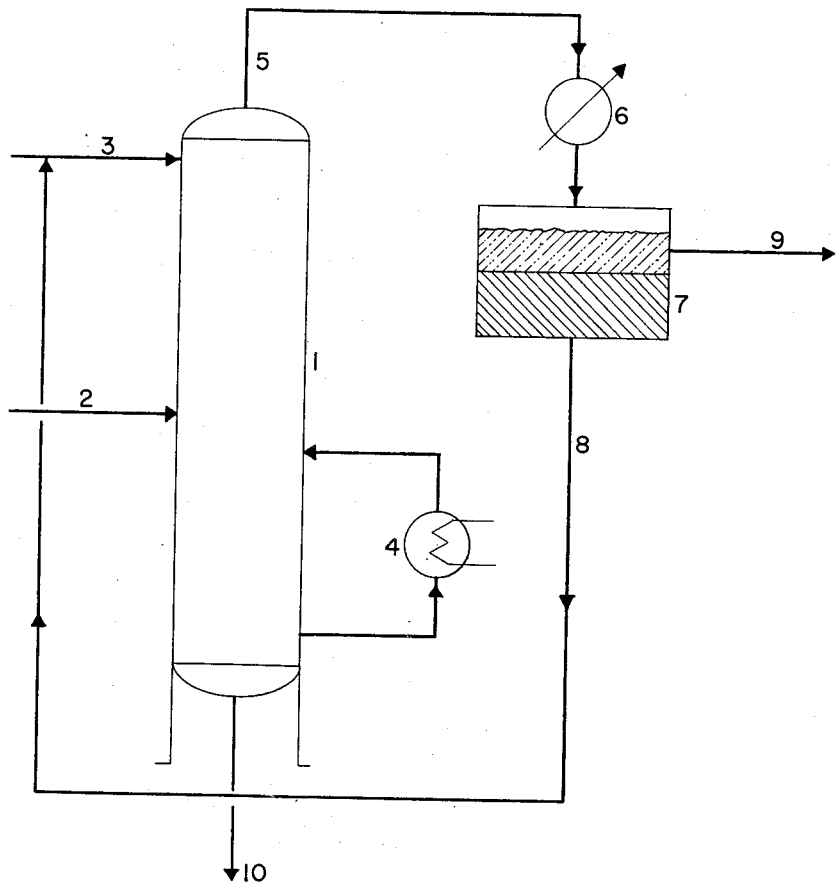
INVENTOR
Harry M. Walker
BY
ATTORNEY United States Patent Office 2,762,760
Patented Sept. 11, 1956

2,762,760
EXTRACTIVE DISTILLATION OF PHENOL-CONTAINING MIXTURES

Harry M. Walker, Dickinson, Tex., assignor to Monsanto Chemical Company, St. Louis, Mo., a corporation of Delaware Application July 23, 1952, Serial No. 300,511

3 Claims. (Cl. 202—39.5)

This invention relates to the purification of phenol and more particularly it relates to the separation of cyclohexanol and/or cyclohexanone from mixtures with phenol.

The production of phenol by catalytic dehydrogenation of cyclohexanol and/or cyclohexanone is well known. In addition to the literature describing the reaction, the process is the subject of U. S. Patents 2,291,585, 2,321,551, and 2,503,641. Since the reaction is not generally complete, the product phenol is usually contaminated with cyclohexanol and/or cyclohexanone and must be purified in order to meet established commercial specifications. Separation of these impurities by the usual methods such as extraction and distillation presents difficulties and complications. Ordinary fractional distillation, e. g., cannot be employed because cyclohexanol and/or cyclohexanone both form azeotropes with phenol. Separation may be achieved by steam distillation as disclosed in U. S. Patent 2,321,551, but the process is not as efficient as might be desired because some phenol is nearly always carried over into the distillate. Azeotropic distillation with water as described in U. S. Patent 1,909,546 is equally ineffective because both phenol and cyclohexanol (or cyclohexanone) form azeotropes with water whose boiling points differ by less than 2° C., thus making difficult their further separation by ordinary practical fractionation.

It is an object of this invention, therefore, to provide an improved process which is both simple and efficient for separating cyclohexanol and/or cyclohexanone from mixtures thereof with phenol.

It is a further object of this invention to provide a simple, efficient and improved process for separating cyclohexanol and/or cyclohexanone from mixtures thereof with phenol by extractive distillation.

Further objects will become apparent from the following description of the novel process of the invention.

It has now been discovered that the relative volatilities of phenol and cyclohexanol (or cyclohexanone as well) can be sufficiently altered by distillation in the presence of water so that separation of these two organic compounds from phenol may be effected. Phenol is infinitely soluble in water at the temperature prevailing during the distillation. Cyclohexanol (or cyclohexanone, as the case may be) and water are substantially immiscible. In a system containing these compounds, therefore, the volatility of the phenol may be reduced during distillation by introducing a constant stream of water countercurrent to the rising vapors to constantly extract the phenol down the column and thus allow the cyclohexanol-water azeotrope to distill overhead. No phenol whatever is carried over into the distillate. Phenol may be readily recovered from the phenol-water stream by a simple azeotropic distillation or other conventional methods such as extraction or dehydration. The cyclohexanol (or cyclohexanone) is readily separated from water by settling and decantation and is thus made available for recycle to the dehydrogenation step to produce more phenol therefrom.

According to this invention, a mixture resulting from the dehydrogenation of cyclohexanol and/or cyclohexanone is subjected to continuous distillation in a fractionating column of conventional design in such a manner that a constant stream of water, continuously supplied at an upper point in the column, flows countercurrent to the ascending vapors thereby extracting phenol therefrom while a cyclohexanol-water azeotrope is taken overhead. The evolved azeotrope is condensed and separated into two phases with the water being returned as reflux to the column for re-use as the extracting agent and the cyclohexanol being returned to the dehydrogenation step. The phenol-water mixture of the bottoms stream is continuously withdrawn and the phenol recovered therefrom by the usual techniques.

The following examples will illustrate this invention but are not to be considered as limiting it in any manner:

*Example 1*

The fractionating column employed was a 30 in. x ⅝ in. glass tube packed with ⅝ in. glass helices. A special head equipped with a phase-separation chamber was attached to the column so that the aqueous phase of the distillate could be returned as reflux to the column. A mixture of 50 g. of phenol, 50 g. of cyclohexanol, and 80 g. of water was charged to a flask fitted to the column and distillation was conducted so as to take off all cyclohexanol overhead and reflux the water until about 40 g. of organic material had been obtained overhead. This material was dried by an azeotropic distillation and assayed by means of refractive index. It was found to contain 91% cyclohexanol.

The column was then switched to total take-off and a stream of pure water was bled in as reflux at such a rate that the total amount of water in the system remained essentially constant. About 10–15 g. more of cyclohexanol were taken off before any phenol began to appear in the distillate as evidenced by a heavy phase in the bottom of the receiver.

The material remaining in the pot was dried by azeotropic distillation with toluene. The dried organic material was fractionated giving phenol (B. P. 180–181.2° C.) with a freezing point of 35° C. This phenol was equivalent in quality to that obtained from a blank run without cyclohexanol in the charge, hence water was assumed to be the impurity which was responsible for the lowered freezing point.

*Example 2*

A similar run was made using cyclohexanone instead of cyclohexanol in the same proportions as are given in Example 1. Results paralleled those in Example 1 in every respect. The bulk of the ketone was obtained as a quite pure fraction and the phenol recovered had a freezing point somewhat higher than that in Example 1, indicating a slightly better-grade product.

While the examples given are representative of batch operations, optimum efficiency may be more nearly achieved by essentially continuous operation.

The invention may be further illustrated by reference to the drawing in which a preferred embodiment is diagrammatically presented. A mixture, for example, of phenol and cyclohexanol, to be separated is introduced into the fractionating column 1 through line 2. The liquid in the lower part of the column is vaporized by means of heat supplied by the reboiler 4. A stream of water is continuously introduced at the top of the column through line 3 and flows down the column countercurrent to the rising vapors. The vapors passing upwardly through the descending water stream, an azeotropic mixture of cyclohexanol and water, are withdrawn overhead through line 5, passed through the condenser 6 where they are liquefied, and into the decanter 7 where they are separated by settling. The water phase is withdrawn from the decanter 7 through conduit 8 and returned to the column through line 3 with the fresh water supply. The cyclohexanol layer is withdrawn through line 9 and may be recycled to an adjoining dehydrogenation unit for producing more phenol or otherwise disposed of. A phenol-water mixture which may be processed by any of several well known techniques for recovery of the phenol is withdrawn through line 10.

Any fractionating column of conventional design providing for countercurrent liquid-vapor contact under reboiling and refluxing conditions may be employed but a packed column is to be preferred. The number of theoretical plates required depends upon the efficiency of separation desired, the quantity of water employed, the reflux ratio, and other related factors; in general, however, from 5 to 25 theoretical plates are adequate.

The feed dehydrogenated mixture is preferentially introduced into the fractionating column at a point midway in the column. The necessary large quantity of water is added continuously near the top of the column at a constant rate to maintain steady state conditions. The temperature of the water introduced into the top of the column is advantageously controlled so that it closely approximates the temperature of liquid on its feed plate. However, the water feed temperature may be lowered for partially condensing more vapors ascending to the water feed plate if desired.

The quantity of water required to be introduced continuously at the top of the column for accomplishing the desired separation may vary over rather wide limits, depending upon the efficiency of separation desired. Enough water must be provided to form a cyclohexanol- and/or cyclohexanone-water azeotrope in addition to the water which descends to the reboiler. More than four parts of water, therefore, per part of cyclohexanol in the charge must be supplied. The minimum concentration of water in the internal reflux for obtaining the required separation depends upon the composition of the feed mixture and may vary accordingly. In order to effect the separation with a reasonable number of plates, a water concentration of at least 50 volume per cent is desirable. Selectivity of separation may be enhanced by employing quantities of water in excess of the minimum, since there is a direct relationship between volatility of the phenol and the quantity of water employed as extracting agent. As the dilution of the internal reflux becomes infinite, separation becomes sharper but operating efficiency is lowered considerably because of the relatively small quantities of dehydrogenated mixture being processed. Too large an excess of water is, therefore, to be avoided. For optimum results on a practical scale with, for example, a mixture containing 50% of phenol and 50% of cyclohexanol and/or cyclohexanone, a satisfactory water concentration in the internal reflux is maintained and excellent separation is achieved if 3-4 volumes of water are employed per volume of feed.

Although generally the extractive distillation is to be carried out at about atmospheric pressure, it may be conducted at, below, or above atmospheric pressure.

What is claimed is:

1. A continuous process for the purification of phenol in a mixture containing phenol and a compound selected from the class consisting of cyclohexanol and cyclohexanone which comprises introducing said mixture to distillation into the lower section of a fractionation column, introducing water into said column at a point in the upper section thereof so that said water flows countercurrently to the rising vapors of said mixture, said water being present in an amount such that the concentration of water in the liquid below the point of addition of the water is at least 50 volume per cent, withdrawing overhead from the column an azeotrope of said compound with water, condensing said azeotrope to form a water phase and an organic phase, returning the water phase to the column for re-use as an extractant, recovering the organic phase, and removing from the bottom portion of the column a water solution of substantially pure phenol.

2. A continuous process for the purification of phenol in a mixture containing phenol and cyclohexanol which comprises introducing said mixture into the lower section of a fractionation column, introducing water into said column at a point in the upper section thereof so that said water flows countercurrently to the rising vapors of said mixture, said water being present in an amount such that the concentration of water in the liquid below the point of addition of the water is at least 50 volume per cent, withdrawing overhead from the column an azeotrope of cyclohexanol with water, condensing said azeotrope to form a water phase and a cyclohexanol phase, returning the water phase to the column for re-use as an extractant, recovering the cyclohexanol, and removing from the bottom portion of the column a water solution of substantially pure phenol.

3. A continuous process for the purification of phenol in a mixture containing phenol and cyclohexanone which comprises introducing said mixture into the lower section of a fractionation column, introducing water into said column at a point in the upper section thereof so that said water flows countercurrently to the rising vapors of said mixture, said water being present in an amount such that the concentration of water in the liquid below the point of addition of the water is at least 50 volume per cent, withdrawing overhead from the column an azeotrope of cyclohexanone with water, condensing said azeotrope to form a water phase and a cyclohexanone phase, returning the water phase to the column for re-use as an extractant, recovering the cyclohexanone, and removing from the bottom portion of the column a water solution of substantially pure phenol.

References Cited in the file of this patent

UNITED STATES PATENTS

| Number | Name | Date |
|---|---|---|
| 1,929,901 | Richard et al. | Oct. 10, 1933 |
| 2,212,810 | Field | Aug. 27, 1940 |
| 2,265,939 | Field | Dec. 9, 1941 |
| 2,291,585 | Bartlett et al. | July 28, 1942 |
| 2,328,719 | Houghton et al. | Sept. 7, 1943 |
| 2,437,649 | Milner | Mar. 9, 1948 |
| 2,702,784 | Rossi | Feb. 22, 1955 |